(12) United States Patent
Zanotti

(10) Patent No.: US 9,402,403 B2
(45) Date of Patent: Aug. 2, 2016

(54) METHOD AND APPARATUS FOR STUNNING ANIMALS INTENDED TO BE SLAUGHTERED

(71) Applicant: Massimo Zanotti, Gussago (IT)

(72) Inventor: Massimo Zanotti, Gussago (IT)

( * ) Notice: Subject to any disclaimer, the term of this patent is extended or adjusted under 35 U.S.C. 154(b) by 0 days.

(21) Appl. No.: 14/964,016

(22) Filed: Dec. 9, 2015

(65) Prior Publication Data
US 2016/0165902 A1 Jun. 16, 2016

(51) Int. Cl.
*A22B 3/00* (2006.01)
*A22B 3/08* (2006.01)

(52) U.S. Cl.
CPC ............... *A22B 3/005* (2013.01); *A22B 3/086* (2013.01)

(58) Field of Classification Search
CPC .................................. A22B 3/00; A22B 3/005
USPC .......................................... 452/52, 57–61, 66
See application file for complete search history.

(56) References Cited

U.S. PATENT DOCUMENTS

| | | | | |
|---|---|---|---|---|
| 5,112,270 A * | 5/1992 | Howard | ............... | A22B 3/02 452/57 |
| 6,126,534 A * | 10/2000 | Jacobs | ............... | A22B 3/005 452/66 |
| 6,135,872 A * | 10/2000 | Freeland | ............... | A01K 45/005 452/57 |
| 6,623,347 B1 * | 9/2003 | Grimsland | ............... | A22B 3/00 452/57 |
| 7,097,552 B2 * | 8/2006 | Ovesen | ............... | A22B 3/00 452/53 |
| 7,448,943 B1 * | 11/2008 | Woodford | ............... | A22B 3/005 452/66 |
| 7,794,310 B2 * | 9/2010 | Lang | ............... | A22B 1/00 452/57 |
| 8,029,342 B2 * | 10/2011 | Anderson | ............... | A61D 7/04 452/66 |
| 8,272,926 B2 * | 9/2012 | Lang | ............... | A22B 3/086 452/57 |
| 8,323,080 B2 * | 12/2012 | Lang | ............... | A22B 3/005 452/57 |
| 2005/0191953 A1 | 9/2005 | Ovesen et al. | | |
| 2008/0108289 A1 | 5/2008 | Zachariassen et al. | | |

FOREIGN PATENT DOCUMENTS

| | | |
|---|---|---|
| EP | 2617288 | 7/2013 |
| EP | 2803272 | 11/2014 |

OTHER PUBLICATIONS

Italian Search Report; Aug. 17, 2015.

* cited by examiner

*Primary Examiner* — Richard Price, Jr.
(74) *Attorney, Agent, or Firm* — Smith, Gambrell & Russell, LLP.

(57) ABSTRACT

A method and apparatus for stunning animals intended to be slaughtered wherein the animals are introduced into and displaced from above downwardly in a closed environment (1) containing a stunning gas mixed with air at an increasing concentration with a top to bottom vertical gradient from a preset initial value to a final higher value. The stunning gas concentration is detected in the upper area (2) of the environment (1) and in case the detected concentration is higher than the preset initial value, the external air is automatically supplied to the upper area at a pressure slightly higher than the atmospheric pressure until the preset initial value is restored.

12 Claims, 1 Drawing Sheet

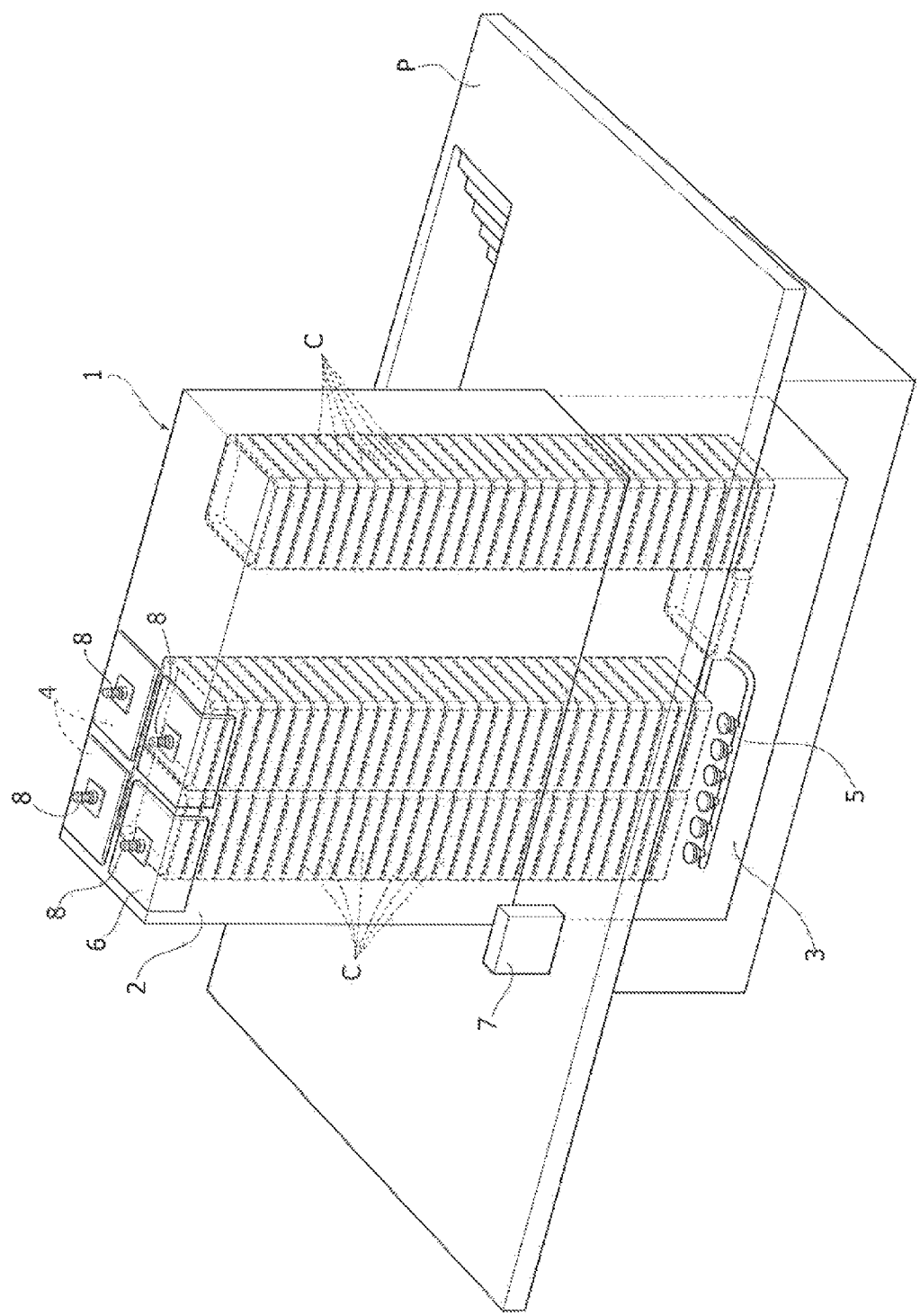

METHOD AND APPARATUS FOR STUNNING ANIMALS INTENDED TO BE SLAUGHTERED

FIELD OF THE INVENTION

The present invention generally regards systems for slaughtering animals (chickens, turkeys, ducks, quails, rabbits), and in particular it regards a method and apparatus for stunning through hypercapnia with the aim of making the animals unconscious to the subsequent slaughter operations.

STATE OF THE ART

Conventionally, as regards the stunning of animals there is provided a cabin in form of a closed chamber into which the animals are introduced and moved from above downwardly. The chamber contains a stunning gas mixed with air at an increasing concentration with a top to bottom vertical gradient from a preset initial low value to a final higher value.

The stunning gas, typically $CO_2$, is injected into the lower area of the chamber, and it tends to remain at the bottom given that it is lighter than air: thus, the concentration thereof, whose initial value in the upper area of the chamber is minimum, increases progressively from the bottom up to the final value which, according to the directives, should be such that the animals be unconscious. Such final concentration, established according to the European directives at 40%, should be attained in a slow and progressive fashion, approximately within 3 to 5 minutes, so as to avoid adverse reactions of the animals and ensuing compulsive movements that could cause traumas and injuries thereto. Thus, it is necessary that the initial stunning gas concentration value in the upper area of the environment at which the animals are introduced be relatively low, i.e. considerably below 20% so as to avoid such inconvenience.

STATE OF THE ART

At the current state of the art, the control of the stunning gas gradient from the upper area to the lower area of the stunning cabin is carried out by detecting the concentration thereof at only one point of the $CO_2$ column, given that the remaining values follow their own distribution flow on the height which is affected by the movement of the animal containers which are progressively displaced downwards in the chamber, by the atmospheric pressure and by the temperature that observed inside the cabin as the animals pass through.

Controlling the concentration only at the lower part of the cabin may reveal concentration values at the entry of the animals in the upper part even amounting to 20-25% and these values should be absolutely avoided in that they may cause adverse reactions of the animals and ensuing traumas.

On the other hand, controlling only the upper part of the cabin may maintain the initial concentration values very low, in the order of 2-3% which are entirely appropriate though with the risk that the final concentration value in the lower part of the cabin may not be sufficiently high, i.e. fail to reach the 40% value required to make the animals unconscious as provided for by the directives.

SUMMARY OF THE INVENTION

The object of the present invention is to provide a stunning method and apparatus of the type defined above in which, though controlling the stunning gas concentration value only at the lower part of the environment, it is possible to reduce and maintain the prescribed final concentration value unaltered at the lower part of the environment.

According to the invention, this object is attained due to the fact that should the concentration of the stunning gas detected in the upper area of the environment have a value exceeding the preset initial value, external air is introduced into this upper area at a pressure slightly higher than the atmospheric pressure until the preset initial value is restored.

The amount and flow rate of the external air introduced into the upper area of the environment shall be proportional to the difference between the detected value and the preset initial value, and the supply of the external air is conveniently automatically carried out through at least one variable speed electric fan arranged in the upper area of the environment.

Thanks to this solution idea, the external air supplied to the upper area forms a layer with slightly higher pressure than the one beneath, thus creating some sort of cap which prevents the stunning gas with higher concentration from rising from the lower area of the environment, thus it is constantly maintained at the required final value. This allows obtaining an efficient control of the development of the stunning gas column in height though maintaining the typical progressive gradient development, crucial to preventing animals passing therethrough from suffering and injuries.

The supply of external air to the upper area of the environment is also advantageous due to the fact that it is usually at a lower temperature with respect to the temperature that develops in the environment due to the animals, which have a body temperature at around 40° C., passing therethrough. Thus, even the temperature in the environment may be controlled and maintained at optimal values.

BRIEF DESCRIPTION OF THE DRAWING

The invention will now be described in detail, with reference to the attached drawing, provided purely by way of non-limiting example, which represents a stunning apparatus according to an embodiment of the invention in a schematic, perspective and partly transparent view.

DETAILED DESCRIPTION OF THE INVENTION

FIG. 1 schematically, and in a non-limited way, shows an apparatus according to the invention for stunning animals intended to be slaughtered.

In a generally per se known manner, the apparatus comprises a cabin 1 made up of sealed metal panels which extend from the floor P of the slaughter facility fully upwards, or even beneath the floor P like in the partly illustrated case, delimiting a closed environment with an upper area generally indicated with 2 and a lower area generally indicated with 3.

A stunning gas typically constituted by $CO_2$ at a pressure in the order of 4 bars and at a temperature in the order of 30° C. is injected into the environment delimited by the cabin 1 in a known fashion (not represented for the sake of simplicity). Given that $CO_2$ gas is heavier than air, it tends to settle at the lower area 3, forming a column with increasing concentration with a top to bottom vertical gradient starting from a minimum initial value, for example in the order of 2-3%, up to a maximum value set at 40% by the directives.

The animals are introduced into the cabin 1 from above through one or more lateral doors 4, in drawer-like containers C, for example superimposed according to two adjacent columns, progressively moved downwardly up to reaching the lower area 3. During such movement, which may occur within a period of time for example comprised between 3 and 5 minutes, the animals encounter the progressively increasing concentrations of $CO_2$ starting from the initial concentration, initially losing reactivity when the concentration is approximately at 20%, then losing consciousness at a higher concentration for example at 30% and finally reaching the maximum concentration of 40%. A possible compressed air insufflation system 5 provided for at the bottom of the cabin 1 allows preventing the gas from settling and remaining at the bottom.

The containers C which reach the base of the columns one at a time are then translated laterally to form one or more columns ascending towards the upper area 2 of the cabin so as to be removed and conveyed to the slaughter stations.

A sensor for detecting the stunning gas concentration in the upper area of the cabin and connected to an external electronic control unit 7 is schematically indicated with 6. The sensor 6 has the function of detecting and verifying, through the electronic unit 7, whether the stunning gas concentration in the upper area 2 reaches the preset initial value, in the order of 2-3% as mentioned.

According to a distinctive aspect of the invention, the cabin 1 is provided with a system for automatically supplying external air, at pressure slightly higher than the atmospheric pressure, to the upper area 2 of the cabin 1 in case the concentration value detected by the sensor 6 is higher than the preset initial value, so as to restore the concentration to the initial value. In the case of the illustrated example, this system comprises one or more variable speed electric fans 8 applied to the upper wall of the cabin 1 and automatically actuated through an electronic control unit 7 as a function of the signals coming from the sensor 6. The amount and flow rate of the external air supplied to the upper area 2 of the cabin 1 in this case, are proportional to the difference between the detected value and the preset concentration value: i.e., the higher the difference, the higher the rotation speed of the fans and thus the amount of external supplied to the upper area 2. As the difference progressively decreases, the variable speed electric fan/s 8 slow the speed thereof up to stopping when the difference between the detected concentration value and the preset value is nullified. The variable speed electric fan/s 8 are restarted at a low speed at every minimum subsequent variation, obtaining an action for maintaining the correct concentration in an intermittently but continuous fashion.

The initial concentration value and the degree of variation between such initial value and the value detected at a time may be regulated through the electronic control unit 7, and the concentration variation may be recorded on a chart alongside the external air supply frequency.

Thanks to this solution idea, the action of the variable speed electric fan/s 8 allows reducing the stunning gas concentration in the upper area 2 of the cabin 1, without altering the concentration value in the lower area 3. This allows obtaining the control of the development of the $CO_2$ column heightwise and simultaneously maintaining the typical progressive gradient development, which is crucial to prevent the animals from suffering and injuries during the stunning. The air supplied under pressure also forms, in the upper area 2 of the cabin 1, a layer at a pressure slightly higher than the one beneath, thus obtaining some sort of cap which prevents the more concentrated $CO_2$ from rising further.

A further advantage of the invention lies in the fact that the external air supplied by the variable speed electric fan/a 8 in the upper area 2 of the cabin 1 is generally a lower temperature with respect to the temperature that is created in the cabin due to the animals, which have a body temperature at about 40° C., passing therethrough, hence allowing conditioning the internal temperature preventing it from reaching excessive values to a point of causing adverse reaction of the animals.

Obviously, the construction details and the embodiments may widely vary with respect to what has been described and illustrated, without departing from the scope of protection of the present invention as described in the claims that follow. Thus, as previously mentioned, the configuration of the stunning cabin and the movement of the animals therein may vary with respect to the ones described with reference to the drawings. In addition, the system for supplying the air under pressure may utilise sources different from the variable speed electric fans.

The invention claimed is:

1. A method for stunning animals intended to be slaughtered wherein the animals are introduced into and displaced from above downwardly in a closed environment (1) containing a stunning gas mixed with air at an increasing concentration with a top to bottom vertical gradient from a preset initial low value to a final higher value, wherein the concentration of the stunning gas is detected in the upper area (2) of the environment (1), characterized in that in case the concentration value of the stunning gas detected in the upper area (2) of the environment (1) is higher than said preset initial value, external air is supplied to said upper area (2) at a pressure slightly higher than the atmospheric pressure until said preset initial value is restored.

2. Method according to claim 1, characterized in that the amount and flow rate of external air supplied to the upper area (2) of said environment (1) are proportional to the difference between the detected value and said preset initial value.

3. Method according to claim 2, characterized in that the detection of the concentration of the stunning gas in said upper area (2) of the environment (1) is carried out continuously and external air is introduced after every detected variation of a preset amount of external air so as to restore the concentration to said preset initial value.

4. Method according to claim 3, characterized in that said preset initial value and said variation of a preset amount of the stunning gas concentration in said upper area (2) of the environment (1) can be regulated.

5. Method according to claim 1, characterized in that the variation of the stunning gas concentration in the upper area (2) of the environment (1) over time is recorded along with the external air supply frequency.

6. Method according to claim 1, characterized in that the external air supplied to the upper area (2) of the environment (1) is at a lower temperature than that of said environment (1).

7. Method according to claim 1, characterized in that the external air is supplied by at least one variable speed electric fan (8).

8. Apparatus for stunning animals intended to be slaughtered, comprising a closed environment (1) into which the animals are introduced and displaced from above downwardly, said environment (1) containing a stunning gas mixed with air at an increasing concentration with a top to bottom vertical gradient from a preset initial value to a final higher value, and means (6) for detecting the concentration of the stunning gas at least in the upper area (2) of the environment (1), characterized in that it comprises means (8) for supplying the external air under pressure to said upper area (2) of the environment (1) designed to be activated when said detecting means (6) detect in the upper area (2) of the environment (1) a value of the stunning gas concentration higher than said preset initial value.

9. Apparatus according to claim 8, characterized in that said external air supply means (8) are configured so that the amount and flow rate of external air supplied to the upper area (2) of said environment (1) are proportional to the difference between the detected value and said preset initial value.

10. Apparatus according to claim 9, characterized in that said detecting means (8) are designed to continuously detect the concentration of stunning gas in said upper area (2) of the environment (1), and said supply means (8) are configured so as to automatically supply external air after every detected variation of a preset amount.

11. Apparatus according to claim 8, characterized in that said external air supply means (8) comprise at least one variable speed electric fan arranged at the top of said environment (1) and connected to an electronic control unit (7) connected to said means (6) for detecting the stunning gas concentration.

12. Apparatus according to claim 10, characterized in that said preset initial value and said variation of a preset amount of the stunning gas concentration in said upper area (2) of the environment (1) can be regulated through said electronic control unit (7).

* * * * *